United States Patent Office 3,773,844
Patented Nov. 20, 1973

3,773,844
PROCESS FOR THE SEPARATION OF ALKENE FROM ORGANIC MIXTURES CONTAINING SAME
Eli Perry, St. Louis, and William F. Strazik, St. Ann, Mo., assignors to Monsanto Company, St. Louis, Mo.
No Drawing. Filed Sept. 22, 1972, Ser. No. 291,461
Int. Cl. C07c 7/02
U.S. Cl. 260—669 A   16 Claims

ABSTRACT OF THE DISCLOSURE

A monoalkene, such as styrene or hexene, is separated from organic mixtures comprising said alkene and another organic component or components by contacting said mixture under pervaporation permeation conditions against one side of a polymeric, permeation membrane, the membrane having a transition metal molecularly dispersed therein and withdrawing on the other side of the membrane a vaporous mixture having a higher concentration of alkene. The transition metal is in an oxidation state and in a form which permits chemical interaction with the monoalkene. Exemplary of transition metal is silver as elemental silver and as silver tetrafluoroborate.

BACKGROUND OF THE INVENTION

Field of the invention

This invention relates to a process for the separation of a monoalkene from organic mixtures comprising said alkene and another organic component or components. In a particular aspect, this invention relates to a process for the separation of monoalkene from organic mixtures containing the same by preferential permeation of the alkene under pervaporation permeation conditions through a polymeric permeation membrane to obtain a more concentrated solution by removing at least a portion of the preferentially permeable alkene component from the original feed solution. In a more particular aspect, this invention relates to a process for the separation of monoalkene from organic mixtures containing same by contacting said mixtures (feed mixture) against one side of a polymeric permeation membrane, the membrane having a transition metal molecularly dispersed therein and withdrawing at the second side of the membrane a vaporous mixture having a higher concentration of said alkene.

Description of the prior art

Separation of monoalkenes from organic mixtures such as the separation of styrene from a mixture comprising styrene and ethylbenzene has been accomplished by distillation procedures. Separation of azeotropic mixtures of organic materials such as mixtures of styrene and 2-chloroethanol and mixtures of ethylbenzene and 2-chloroethanol by pervaporation through certain polymer membranes followed by distillation is also known to the art. Polymeric materials employed in the form of permeation membranes which have been indicated as being useful in the above-referred-to combination membrane-distillation separation procedure include polyethylene, polystyrene, neoprene, polyacrylonitrile, nylon, cellulose, cellulose acetate and polyvinylalcohol.

SUMMARY OF THE INVENTION

It has been discovered in accordance with the present invention that monoalkene is effectively separated from organic mixtures comprising the alkene and another organic component or components by contacting the mixture under pervaporation permeation conditions against one side of a polymeric permeation membrane, said membrane having a transition metal molecularly dispersed therein and withdrawing at the second side of the membrane a vaporous mixture having a higher concentration of alkene.

DETAILED DESCRIPTION

The process of the present invention comprises contacting an organic feed mixture containing monoalkene against one side of a polymeric permeation membrane and withdrawing at the second side a mixture having a concentration of the preferentially permeable alkene than in the aforesaid feed mixture. It is essential that the mixture at the second side be maintained at a lower chemical potential than the mixture on the feed side. It is also essential that the product be withdrawn at the second side in the vapor state. In the commercial utilization of the process multistage operation is feasible since this permits the operation of the individual stages at various concentrations and temperatures in order to achieve the optimum driving force for the process.

For each individual stage the effectiveness of the separation is shown by the separation factor (S.F.). The separation factor (S.F.) is defined as the ratio of the concentrations of two substances, A and B, to be separated, divided into the ratio of the concentrations of the corresponding substances in the permate $$S.F. = \frac{(C_A/C_B) \text{ in permeate}}{(C_A/C_B) \text{ in permeant}}$$

where $C_A$ and $C_B$ are the concentration of the preferentially permeable component and any other component of the mixture or the sum of other components respectively.

In carrying out the process of the present invention, the first or feed side of the membrane is such that the activities of the components are greater than the activities on the second side of the membrane. Preferably, the first side is above atmospheric pressure and the second side below atmospheric pressure. Still more preferably, the second side is maintained such that the pressure differential is greater than 0.01 atmosphere. A further preferred mode of operation is with the second side maintained at a vacuum of greater than 0.2 mm. Hg.

The term "chemical potential" is employed herein as described by Olaf A. Hougen and K. M. Watson ("Chemical Process Principles, Part II," John Wiley, New York, 1947). It is related to the escaping tendency of a substance from any particular phase. For an ideal vapor or gas, this escaping tendency is equal to the partial pressure so that it varies greatly with changes in the total pressure. For a liquid, change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat economies are to be effected in multi-stage process.

The feed side may be at pressures less than atmospheric, but preferably greater than atmospheric, and also at pressures over and above the vapor pressure of the liquid components. The collection or permeate vapor side of the membrane is preferably less than atmospheric pressure, but under proper feed side conditions, also may be greater than atmospheric pressure. The total pressure on the feed side is preferably between 0 p.s.i. absolute and 5,000 p.s.i.g. The conditions are always such as to maintain a higher chemical potential on the feed side than on the collection or vapor side.

The temperatures on the feed side and the collection side may vary over a wide range. However, temperatures should be avoided which cause substantial decomposition of any of the organic materials in the mixture or of the membrane, and which cause the vapor pressure on the collection side of any of the permeated materials to be exceeded by the pressure being maintained on that side. Typically, an increase in temperature causes an increase in permeation rate. A dramatic increase in rate often occurs when the temperature exceeds the glass transition temperature of the polymer membrane being used in the separation procedure.

The process of the present invention provides for the separation of monoalkene from organic mixtures comprising monoalkene and another organic component or components. The other organic components may be any other organic material. However, if one or more of the other components is an alkene such other alkene must not have more alkene linkages than the preferentially permeable monoalkene. Thus monoalkenes other than the preferentially permeable alkene may be present in the organic mixture.

The term "monoalkene" as used herein is meant to include organic compounds having 1 alkene linkage in the organic structure without limitation as to type (i.e. aromatic or aliphatic), molecular configuration (i.e. cyclic, branched chain or straight chain) or isomeric structure. Examples of such alkenes include for example styrene, butene, octene, hexene, dodecene, cyclohexene, and cyclopentene. Typically the monoalkene contains from 2 to about 12 carbon atoms.

In accordance with the present invention, separations are carried out by removal of the preferentially permeable monoalkene through the membrane with the said alkene in a higher concentration than in the feed being recovered from the collection side of the membrane as a vapor with the imposition of a state of lower chemical potential on such collection side of the membrane. For example, a mixture of styrene and ethylbenzene may be applied to one side of a flat diaphram or membrane to accomplish removal of at least a part of the styrene leaving a more highly concentrated ethylbenzene solution on the feed side of the membrane. A state of lower chemical potential is maintained on the collection or downstream side of the membrane by vacuum e.g. from 0.1 mm. Hg. to the vapor pressure of the organic component of the mixture which has the lowest vapor pressure at the membrane at the respective temperature as long as the vapor phase is present on the downstream side. In the system referred to above, the styrene selectively passes through the membrane with the styrene-rich composition being removed rapidly as vapor from the collection side of the membrane.

In contrast to the present invention the employment of permeates in liquid phase on the second side of the membrane is impractical because the applied pressure has been found to be prohibitively high e.g. up to 1,000 atmospheres being necessary because of osmotic pressures. Liquid-liquid permeation is largely an equilibrium phenomenon unless the osmotic forces are overcome while in contrast liquid-vapor or vapor-vapor permeations are rate controlled processes even at moderate conditions in which the vapor is removed as soon as it reaches the collection surface of the membrane. Liquid-vapor and vapor-vapor separations are accordingly much more effectively carried out than liquid-liquid separations.

The permeation membrane employed in the process of the present invention is a polymeric permeation membrane having a transition metal molecularly dispersed therein. The term "transition metal" as used herein is meant to include elemental metal and combined metal. The membrane may be a simple disk or sheet of a membrane substance which is suitably mounted in a duct or pipe or mounted in a plate and frame filter press. Other forms of the membrane may also be employed such as hollow tubes and fibers through which or around which a feed is supplied or recirculated with the product being removed at the other side of the tube as a vapor. Various other shapes or sizes are readily adaptable to commercial installations. The membrane, of course, must be insoluble in the organic medium to be separated. "Membrane insolubility" as used herein is taken to include that the membrane material is not substantially solution-swellable or sufficiently weakened by its presence in the solution to impart "rubbery" characteristics which can cause creep and rupture under the conditions of use including high pressures.

The art of membrane usage is well known with substantial literature being available on membrane support, fluid flow and the like. The present invention is practiced with such conventional procedures and apparatus. The membrane, must of course, be sufficiently thin to permit permeation as desired, but sufficiently thick so as to not rupture under pressure conditions employed. Typically, suitable membranes have a thickness of ½ to about 10 mils.

In the process of the present invention any polymeric composition suitable for use as a permeation membrane can be employed in the formation of the polymeric membrane. The polymers may be linear or cross-linked and may vary over a wide range of molecular weights. The polymeric compositions may be various homopolymers and copolymers including grafts, blocks and polymer blends. Examples of such polymers include polyacrylonitrile, polyvinylalcohol, polyvinylchloride, cellulose, cellulose esters, nylon, polyethylene, polystyrene, neoprene, copolymers of acrylonitrile and styrene, copolymers of acrylonitrile and 2-methylvinylpyridine, blends of polyacrylonitrile and poly(ethyleneimine), copolymers of acrylonitrile and vinylhalide, poly(methacrylonitrile) and copolymers such as methacrylonitrilevinylhalides, blends of acrylonitrile and polyvinyl chloride, copolymers of ethylene and acrylic acid, etc. and the like. Acrylonitrile-containing copolymers and polymer blends are particularly preferred.

The metal employed in the polymeric permeation membrane used in the present invention is a transition metal (the transition metals of Groups I–B, II–B, III–B, IV–B, V–B, VI–B, VII–B and VIII–B of the Periodic Table as represented on p. 174 of General Chemistry (Sisler, Vanderwerf and Davidson (1949)—The MacMillan Company)). For optimum effectiveness, the transition metal must be in a form and in an oxidation state to permit chemical interaction between it and the preferentially permeable monoalkene. Chemical interaction of the preferentially permeable monoalkene and transition metal is readily determined by known methods. Examples of such metal compounds or species which when molecularly dispersed in a polymeric permeation membrane are useful in the process of the present invention include

| | |
|---|---|
| $AgNO_3$ | Rh (I) |
| $CuCl_2$ | Rh (II) |
| $HgCl_2$ | Pd (benzonitrile)$_2Cl_2$ |
| $AgBF_4$ | $RhCl_3$ |
| Ag(O) | $AgSbF_6$ |
| Pt (II) | $Pt(PPh_3)_2C_2H_4$ |
| Pd (II) | $PtCl_4$ |
| Cu (I) | $Rh_2(C_2H_4)_4Cl_2$ |

As previously stated, the transition metal can be present in the membrane in a free state or in a combined state for example as a salt, an hydroxide or other suitable combined form provided, of course, that the transition metal compound is molecularly dispersed in the polymeric membrane and is in a form and an oxidation state which permits its chemical interaction with the preferentially permeable monoalkene. If desired, more than one transition metal can be incorporated in the membrane. The amount of transition metal which is contained in the polymeric membrane can vary over a wide range with the preferred amount depending among other things, on the particular metal or form of metal and the particular polymeric membrane. Any effective amount of metal can be employed. Amounts in the range of from about 0.1 to about 40% are typically employed with amounts in the range of from about 1 to about 35% being generally preferred. Amounts over about 50% should generally be avoided since such amounts tend to weaken the membrane.

In order to obtain optimum separation results, it is desired that the metal be maintained in the polymeric membrane during permeation. Sufficient chemical interaction of metal and polymer to inhibit removal of the metal from the membrane during the process of permeation is, therefore, desired. Effective membranes in which chemical interaction of metal and polymer occurs are composed of polymers which contain coordinating groups which groups form covalent (including coordinate covalent) bonds with the requisite metal, the metal thereby bound at least to some degree to coordinating groups contained in the polymer. Since any Lewis base (or molecule possessing one or more sites which can function as a Lewis base by donation of electrons) can coordinate with a metallic ion or atom acting as a Lewis acid, it will be appreciated that there is a large number and variety of such coordinating groups which are present or which can be incorporated into suitable polymeric permeation membrane compositions. Such coordinating groups in which nitrogen is the donor atom include amine groups (primary, secondary and tertiary) for example polyethyleneimine and poly(vinylpyridine); amide groups for example nylon; nitrile groups for example acrylonitrile and hydrazide groups. Suitable coordinating groups in which oxygen is the donor atom include alcohol groups for example, polyvinylalcohol; carbonyl groups, for example polymethacrylate and ether groups such as polyethylvinylether. Suitable coordinating groups in which sulfur serves as the donor atom include thiourea groups, thioether groups, alkyl sulfide groups, and thiocarbonyl groups. Other groups which are present or can also be incorporated into the polymer are groups which contain carbon atoms or carbon-carbon unsaturated bonds either or both of which act as donor sites for the transition metal incorporated in the membrane, for example metallocene polymers such as polyvinylferrocene and polymers containing carbon-carbon double bonds such as polyisoprene. Chemical interatcion can be effected by other suitable means such as by ionic bonding of transition metal to polymers having active ionic groups, suitable anionic moieties or endgroups including carboxylate, sulfonic, phosphonate, phosphonic, arsenic and telluric.

Although it is preferred, in order to obtain optimum results and also to minimize loss of metal from the polymeric permeation membrane during permeation, that the transition metal be chemically interacted with polymer, the present invention also encompasses membranes wherein the metal is not chemically interacted with the polymer provided, of course, that the metal is, in all cases, molecularly dispersed in the membrane. However, in all cases interaction of polymer and metal is preferred.

Metal-containing membranes for use in the process of the present invention can be prepared by any suitable procedure with such procedures including casting from a solution or dispersion of the polymer and a soluble form of the metal, such as salt, and melt pressing an intimate mixture of powdered polymer and metal. Also the polymeric membrane may be first formed for example by casting and then interacted with transition metal for example by soaking the preformed membrane in a solution containing the transition metal.

Often, improved monoalkene permeation can be effected if the metal-containing polymeric membrane is conditioned prior to use. The preconditioning can serve among other things to replace undesirable ligands (e.g. from solvent) from the metal by ligands more easily displaced during permeation. This preconditioning can be done, for example, by soaking the membrane in a solution containing displacing ligands or by casting the polymeric membrane from a solution which contains, in addition to the polymer and the metal species and the solvent, an organic material which comprises an alkene linkage.

The following examples illustrate specific embodiments of the present invention. In the examples the membranes employed were in the form of film disks and were mounted in a membrane holder.

EXAMPLE 1

Membrane permeations were conducted for the purpose of separating styrene from an organic liquid (70 wt. percent styrene and 30 wt. percent ethylbenzene). The separations were carried out under pervaporation conditions at approximately room temperature. Each membrane was approximately 1 mil thick. In each run the pressure on the liquid side was atmospheric and the pressure on the vapor side was 0.1 mm. Hg. Preferential permeation of styrene was effected in each run. The results are shown in Table I. The membranes employed were prepared by casting a film from a medium prepared by dispersing the metal compound in a solution containing the polymer.

EXAMPLE 2

The procedure of Example 1 is followed to separate hexene from a liquid mixture of hexene and hexane using polymeric membranes having a transition metal molecularly dispersed therein.

While the invention has been described with reference to particular embodiments thereof, it would be appreciated that modifications and variations are possible without departing from the invention.

TABLE I

| Run No. | Polymer membrane | Metal | Weight [1] percent metal in membrane | Feed additive | Separation factor (SF) |
|---|---|---|---|---|---|
| 1 | Poly(vinylchloride) | $Al(NO_3)_3$ | 33 | None | 1.21 |
| 2 | (4/1) poly(acrylonitrile)/poly(vinylchloride)polymer blend. | $AgNO_3$ | 10 | do | 0.2 |
| 3 | Poly(acrylonitrile) | $AgNO_3$ | 19 | do | 1.55 |
| 4 | do | $CuCl_2$ | 15 | do | 1.6 |
| 5 | do | $HgCl_2$ | 49 | do | [2] 1.9–2.3 |
| 6 | Copolymer(acrylonitrile/38 mole percent styrene) | $AgNO_3$ | 20 | do | 1.32 |
| 7 | do | $AgNO_3$ | 20 | Methanol [3] | 1.65 |
| 8 | do | $AgBF_3$ | 20 | None | 1.38 |
| 9 | do | $AgBF_4$ | 20 | Methanol [3] | [2] 2.38–2.85 |
| 10 | do | $PtCl_2$ | 20 | None | 1.3–1.7 |
| 11 | do | $HgCl_2$ | 20 | do | 1.62 |
| 12 | do | $Ni(o)[P(OC_2H_5)_3]_4$ | 20 | do | [2] 1.66–1.74 |

See footnotes at end of table.

TABLE 1—Continued

| Run No. | Polymer membrane | Metal | Weight [1] percent metal in membrane | Feed additive | Separation factor (SF) |
|---|---|---|---|---|---|
| 13 | Copolymer(acrylonitrile/38 mole percent styrene) | $HgCl_2$ | 20 | Methanol [3] | 1.7 |
| 14 | Aromatic hydrazide-amide polymer (X-500) | $AgBF_4$ | 30 | None | 1.92 |
| 15 | Copolymer[acrylonitrile/acrylic acid (9 mole percent)] | $Ag^+$ | (4) | do | 1.25 |
| 16 | Copolymer[ethylene/acrylic acid (4 mole percent)] | $Ag^+$ | (4) | do | 1.25 |
| 17 | Copolymer [acrylonitrile/2-methyl-5-vinylpyridine (32 mole percent)]. | $AgNO_3$ | (4) | do | 1.6 |
| 18 | do | $AgNO_3$ | (4) | Methanol [3] | 3.0 |
| 19 | do | $AgBF_4$ | (4) | None | [2] 4.1–6.3 |
| 20 | do | $AgBF_4$ | (4) | Methanol [3] | [2] 3.5–3.7 |
| 21 | do | $HgCl_2$ | (4) | None | [2] 1.2–2.3 |
| 22 | do | $HgCl_2$ | (4) | Methanol [3] | [2] 2.2–3.6 |
| 23 | do | $PtCl_2$ | (4) | None | [2] 1.3–3.5 |
| 24 | do | $PtCl_2$ | (4) | Methanol [3] | 2.15 |
| 25 | Copolymer[acrylonitrile/4-vinylpyridine (69 mole percent)]. | $AgNO_3$ | (4) | None | [2] 1.52–7.22 |

[1] Weight of metal compound where applicable (when not recorded, amount is less than 50%)
[2] Represents multiple runs
[3] Methanol is 8% of total feed.
[4] Not recorded

What is claimed is:

1. A process for the separation of monoalkene from organic mixtures comprising said alkene and another organic component which comprises contacting the mixture against one side of a polymeric permeation membrane, said membrane having molecularly dispersed therein an effective amount up to about 50% by weight based on the weight of the membrane of a transition metal, said transition metal being in a form and in an oxidation state to permit chemical interaction with the said alkene, and withdrawing at the second side of the membrane a vaporous mixture having a higher concentration of said alkene than the aforesaid organic mixture with the mixture at the second side being maintained at a lower chemical potential than the mixture on the other side of the membrane.

2. The process of claim 1 wherein the pressure on the second side of the membrane is less than atmospheric pressure and lower than the pressure on the other side of the membrane.

3. The process of claim 1 wherein the organic mixture is a liquid mixture.

4. The process of claim 1 wherein the metal is interacted with the polymeric membrane.

5. The process of claim 1 wherein the organic mixture comprises styrene and ethylbenzene.

6. The process of claim 1 wherein the metal is silver.

7. The process of claim 6 wherein the silver is in the form of silver tetrafluoroborate.

8. The process of claim 1 wherein the polymeric membrane is poly(vinyl chloride).

9. The process of claim 1 wherein the polymeric membrane is poly(acrylonitrile).

10. The process of claim 1 wherein the polymeric membrane is an acrylonitrile containing copolymer.

11. The process of claim 10 wherein the copolymer is acrylonitrile/styrene.

12. The process of claim 10 wherein the copolymer is acrylonitrile/2-methyl-5-vinylpyridine.

13. The process of claim 10 wherein the copolymer is acrylonitrile/4-vinyl pyridine.

14. The process of claim 1 wherein the metal is mercury.

15. The process of claim 1 wherein the metal is platinum.

16. The process of claim 1 wherein the metal is nickel.

References Cited

UNITED STATES PATENTS

| | | | |
|---|---|---|---|
| 2,970,106 | 1/1961 | Binning et al. | 260—674 R |
| 3,228,876 | 1/1966 | Mahon | 260—674 R |
| 3,513,213 | 5/1970 | Beckham et al. | 260—669 A |
| 3,726,934 | 4/1973 | Strazik et al. | 260—669 A |

CURTIS R. DAVIS, Primary Examiner

U.S. Cl. X.R.

260—674 R, 677 A, 681.5 R